United States Patent [19]
Chen

[11] Patent Number: 5,541,245
[45] Date of Patent: * Jul. 30, 1996

[54] POLYOLEFIN/ALKYLLACTAMIDE COMPOSITION

[75] Inventor: Bing-Lin Chen, Germantown, Tenn.

[73] Assignee: Witco Corporation, Greenwich, Conn.

[ * ] Notice: The portion of the term of this patent subsequent to Feb. 16, 2010, has been disclaimed.

[21] Appl. No.: 548,092

[22] Filed: Oct. 25, 1995

Related U.S. Application Data

[60] Continuation of Ser. No. 4,836, Jan. 19, 1993, which is a division of Ser. No. 791,567, Nov. 12, 1991, Pat. No. 5,187,215.

[51] Int. Cl.$^6$ .................................................. C08K 5/20
[52] U.S. Cl. ................................................ 524/224
[58] Field of Search ............................ 524/224, 425, 524/448, 449, 451

[56] References Cited

U.S. PATENT DOCUMENTS 5,187,215   2/1993   Chen .......................................... 524/224

Primary Examiner—Peter D. Mulcahy
Attorney, Agent, or Firm—Lockwood, Alex, Fitzgibbon & Cummings

[57] ABSTRACT

A method for reducing the blocking properties of polyolefins by incorporating into the polyolefin an effective amount of a lactamide having the formula:

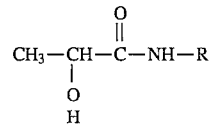

wherein R is alkyl having from about 14 to about 22 carbon atoms. Optionally, there can be included with the lactamide a finely divided inorganic material. Also disclosed are compositions of matter comprising a polyolefin, such as homopolymers and copolymers of ethylene and propylene, the aforedescribed lactamide and optionally a finely divided inorganic material.

6 Claims, No Drawings

POLYOLEFIN/ALKYLLACTAMIDE COMPOSITION

This is a continuation of application Ser. No. 08/004,836, filed Jan. 19, 1993, which is a divisional of Ser. No. 07/791,567, filed Nov. 12, 1991, U.S. Pat. No. 5,187,215.

BACKGROUND

This invention relates to polyolefinic polymers having improved properties. In particular this invention relates to reducing the blocking properties of polyolefinic compositions. An important aspect of this invention is a polyolefinic composition containing lactamides having saturated substituents.

Olefin homopolymers and copolymers are of commercial importance for the manufacture of numerous articles such as films and other items. In order to be useful for many of these functions it is desirable that the polyolefinic composition have good slip characteristics. This can be determined by measuring the coefficient of friction of the polyolefin. It is also important that the polyolefinic composition have good antiblock property.

In order to obtain a satisfactorily low block, often antiblock agents are added to the polyolefin to lower its blocking characteristic. Many antiblock agents and other additives for polyolefins are disclosed in the literature. These additives will lower the blocking force of the polyolefin to desired levels, permitting ready handling of shaped articles and films prepared from the polyolefinic material. Polyolefinic polymers having poor slip and poor antiblock characteristics are difficult to handle when the polymer is manufactured in the customary manner of large rolls. During storage and subsequent processing, the low slip and high block films tend to adhere layer to layer. Also such films can encounter large frictional forces in processing equipment that often cause distortions and even tearing of the film, especially when using thin film.

Rowland et al U.S. Pat. No. 2,956,979 discloses inhibiting the blocking tendencies of polyethylene by introducing into the composition a small amount of an alkylol amide of the structural formula:

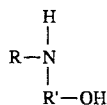

wherein R is a saturated aliphatic acyl radical of from about 18 to about 30 carbon atoms and R' is an alkyl radical group of 1 to 6 carbon atoms. Toy et al U.S. Pat. No. 3,028,355 discloses the use of diatomaceous earth to reduce the tendency of polyethylene to block. Haeske et al U.S. Pat. No. 3,266,924 discloses the blending of a mixture of finely divided siliceous material and a fatty acid amide slip agent into polyethylene to enhance its slip and antiblocking properties. Ross et al U.S. Pat. No. 3,326,840 discloses the incorporation of a small amount of a mono-N-substituted saturated carboxylic acid amide of the formula:

wherein R is an aliphatic acyl radical having from 12 to 30 carbon atoms and R' is an aliphatic group having from 1 to 6 carbon atoms, especially an alkylol group, into a copolymer of ethylene and an aliphatic ethylenically unsaturated carboxylic ester to improve its resistance to blocking and improve its slip properties.

Foster U.S. Pat. No. 3,647,738 discloses blending an amide having the formula:

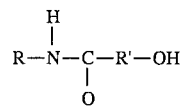

wherein R is an alkenyl radical having 18 to about 22 carbon atoms and R' is a divalent hydrocarbon radical containing 3 to 15 carbon atoms with an alpha-olefin polymer composition to provide compositions having low blocking and no bloom characteristics and high slip properties.

The foregoing patents and other literature disclose a variety of additives that improve the slip and/or blocking properties of polyolefins. It is important that the polyolefinic compositions containing the agents have reduced blocking properties so that films and other products made from the polyolefin can be stacked or otherwise piled together.

Accordingly it is an object of the present invention to reduce the blocking properties of polyolefins.

Also an object of the present invention is the prevention of polyolefin films from adhering to each other during storage.

Another object of the present invention is to reduce the blocking to polyolefin compositions without adversely affecting the optical properties of the polyolefin.

Other objects of the present invention will become apparent from the ensuing description.

SUMMARY OF THE INVENTION

The compositions of this invention comprise a polyolefin polymer and an effective amount of a lactic acid amide having the structural formula:

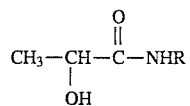

wherein R is alkyl having from about 14 to about 22 carbon atoms. Optionally, there can be included with the lactamide a finely divided inorganic material. The method of the present invention comprises incorporating an effective amount of a lactic acid amide of the above structural formula and optionally a finely divided inorganic material into a polyolefin polymer forming a polyolefin composition having reduced blocking properties.

DETAILED DESCRIPTION OF THE INVENTION

The present invention provides for polyolefins having reduced blocking properties. This permits layers of polyolefin materials to be piled together. The polyolefins can be homopolymers and copolymers and mixtures thereof.

Among the polyolefins of this description are ethylene and propylene homopolymers and copolymers. Polyethylene can be low density and medium density polymeric material. Linear low density polyethylene is in general a copolymer of ethylene and up to about 10 weight percent of a second olefin, such as propylene, butene, hexene or octene. High density polyethylene is normally a homopolymer.

There are, basically, two types of olefin polymerization techniques for preparing high molecular weight olefin polymers and copolymers. The oldest commercial technique involves high pressure, high temperature, and the use of a free radical initiator, such as peroxide; these type polymers are generally known as low density polyethylene (LDPE). These LDPE polymers contain branched chains of polymerized monomer units pendant from the main polymer "backbone" and generally have densities in the range of about 0.910–0.935 gms/cc.

The other commercially-used technique involves coordination catalysts of the "Ziegler" type or "Phillips" type and includes variations of the Ziegler type, such as the Natta type. These catalysts may be used at very high pressures, but are generally used at very low or intermediate pressures. The products made by these coordination catalysts are generally known as "linear" polymers because of the substantial absence of branched chains of polymerized monomer units pendant from the main polymer "backbone," and they are also generally known as high density polyethylene (HDPE). Linear polyethylene (HDPE) ordinarily has a density in the range of 0.941 to 0.965 gms/cc.

When ethylene is polymerized along with minor amounts of alpha, beta, ethylenically unsaturated alkenes having from 3 to 12 carbons per alkene molecule, preferably 4 to 8, the polymer remains in the "linear" classification; and are conveniently referred to as "linear" low density polyethylene" (LLDPE). These polymers retain much of the strength, crystallinity, and toughness normally found in HDPE homopolymers of ethylene, but the highest alkene comonomers impart high "block" characteristics to extrusion-cast films.

Other homopolymers which can be used include: polypropylene, polybutene-1, poly(4-methylpentene-1) and the like.

Exemplary of the copolymers of olefinically unsaturated aliphatic hydrocarbons which are preferred are ethylene-propylene copolymers, containing about 1 to about 99% by weight, based on the total copolymer, of propylene copolymerized therein, ethylene-butene-1 copolymers containing about 1 to about 99%, based on the total copolymer of butene-1 copolymerized herein ethylene-benzene-1 copolymers containing about 1 to about 99% by weight based on the total copolymer of hexene-1 copolymerized therein and the like.

The homopolymers and copolymers of olefinically unsaturated aliphatic hydrocarbons referred to above can be made by either free-radical catalyzed high pressure techniques or anionic catalyzed low pressure techniques known in the aft and described in "Crystalline Olefin Polymers" Part I by R. A. V. Raff and K. W. Doak, Interscience Publishers, NYC 1965 which is incorporated herein by reference.

The ethylene-acrylic acid interpolymers ethylenemethacrylic acid interpolymers, ethylene-vinyl acetate interpolymers and ethylene-alkyl acrylate methacrylate interpolymers of this invention can be made by the free radical, random interpolymerization of ethylene with the corresponding comonomer using methods well known in the art including bulk, solution aqueous suspension, non-aqueous dispersion and emulsion techniques in either batch or continuous process.

The melt index of the ethylene/vinyl acetate copolymers of this invention can range from about 0.01 to 500 dg/min. with a range of about 0.2 to 20 dg/min. being preferred. These ethylene-vinyl acetate copolymers preferably contain about 1.5 to about 20% by weight of vinyl acetate copolymerized therein.

There are numerous polyolefin resins useful in the present invention. For example, Rexene high molecular weight, low density polyethylene resins made by the polymerization of ethylene using a free radical initiator at high pressure and high temperature was used int eh experimental work reported in this invention. These polyethylene resins have the following properties:

Density 0.921 grams/cc

Melt Index 1.0 grams/10 minutes

Tensile (yield) 1500 psi

Tensile (at break) 2100 psi

Ultimate Elongation 500%

Secant Modulus 50.000 psi

Hardness 48 Shore D

Softening Point (Vicant) 200° F.

Polyolefins useful in the present invention can be selected depending upon the desired properties of the final composition. Polypropylene such as Petrothene PP 8000-GK of Quantum Chemical Co. which has a density between about 0.89–0.91 grams/cc and a melt index of 5.0 grams/10 minutes can also be used.

Various additives are often incorporated into the polyolefin. One such group of additives are antioxidants such as hindered phenols, phenolic phosphites, secondary arylamines and the like. These antioxidants are used in quantities between about 0.01 to about 1 weight percent of the polymer. Other additives such as colorants, antiblocking agents, antistatic agents and lubricants are commonly used.

The polyolefin compositions of the present invention comprise polyolefin polymer and an effective amount of the aforedescribed lactic acid amide sufficient to reduce the blocking properties of the polyolefin.

Slip is the ability of films of the polyolefins to slide past one another. Antiblocking is the ability of films of the polyolefins to avoid adhering to one another and to separate from one another.

As previously indicated, there are many materials known to improve slip and blocking properties of films. The materials previously used as slip and antiblocking agents such as unsubstituted amides of long-chain fatty acids, particularly erucamide, and finely divided inorganic minerals, such as silica, mica, talc, diatomaceous earth, and calcium carbonate, do not provide the polyolefinic polymer with the desired properties. These properties are provided by the present compositions and method.

In general the presence of from about 0.05 to less than about 0.5 weight percent of the lactic acid amides of the present invention in the polyolefin composition will provide excellent anti-blocking characteristics. Larger amounts of said lactic acid amides can be used in many instances without loss of the anti-blocking properties of the composition. In certain instances it is preferred that the polyolefin composition contain from about 0.1 to about 0.2 weight percent of the lactic acid amide. Amounts above 0.5 weight percent of said lactic acid amide can be used if desired. In many instances, it is desirable to use a mixture of the lactamides of the present invention. The use of such mixtures is within the scope and teaching of the present invention.

Included among the lactic acid amide compounds useful in the present invention are N-behenyl lactamide, N-palmityl lactamide, N-arachidyl lactamide and N-stearyl lactamide.

Optionally, the compositions of the present invention may contain components in addition to the lactamides which further the reduction of the blocking properties of the polyolefin polymer. For example, it has been found that the addition of a finely divided inorganic material can enhance the decrease in the blocking properties of the polyolefin compositions of the present invention. Thus the blocking properties of the polyolefin which can be lowered by the addition of an effective amount of a lactic acid amide in accordance with the present invention, can often be lowered further by the presence of an effective amount of finely divided inorganic material. In general the presence of from about 0.05 to about 1.0. preferably from about 0.1 to about 0.5, weight percent of the finely divided inorganic material in the polyolefin composition will be of value in reducing the blocking properties of the polyolefins. Examples of these finely divided materials are silica, mica, talc, diatomaceous earth and calcium carbonate.

The polyolefin composition of the present invention can be prepared by admixing the polyolefin polymer and the lactic acid amide by various methods.

One method of preparation is to blend a masterbatch of the polyolefin polymer containing the lactic acid amide and other additives. This can be accomplished by grinding polyolefin pellets in a mill to form a coarse granule. The lactic acid amide and other additives are melted onto the surface of the polyolefin granules with the use of a heat lamp. Then the granules are mixed and the mixture is extruded through a capillary die to form a strand which is pelletized. If desired, the pelletizing procedure can be repeated as many times as desired so as to insure adequate mixing of the components.

The masterbatch can then be added to virgin polyolefin polymer by shaking and tumbling the masterbatch and polyolefin pellets. Then the mixture can be converted into the desired product by cast extrusion, blow molding, blow extrusion, compression molding or other commercial method.

When an extrusion is desired, the mixture can be extruded through a two-stage mixing screw with a 3:1 compression ratio and a 20:1 length:diameter ratio, although other equipment can be used. The temperature of the barrel and die are controlled. As the molten plastic tube emerges from the die it can be blown with air to the predetermined diameter and cooled with air.

Also the composition of the present invention can be cast into film by extrusion through a slot die using a simple screw extruder having characteristics such as those for the aforedescribed two-stage mixing screw. Similar test results are obtained from cast film as with blown films.

When the lactic acid amides are incorporated into polyolefin polymers at effective levels, improved blocking properties are found in the polyolefin polymers. The blocking properties of the polyolefin films can be determined by measuring the force necessary to separate two pieces of film.

The following procedure was used to obtain the results reported in Table 1–3. Square samples of film (4 inches×4 inches) were maintained at 60° C. for 20 hours under a pressure of one pound per square inch. Two pieces of film were secured on two parallel plates with magnetic clamps on an Electronic Block-Reblock Tester. Model D-9046 (Kayness, Inc.). The lower plate is attached to the base of the instrument. The upper plate is attached to arm and rests on the base plate. During the block test, the loading of the arm increases until the two plates are separated by ¾ inch. Block measurements were made on five different films and the average reported in the tables. A block force of more than 50 grams indicates that field problems will likely be encountered.

Various additives were incorporated into low density polyethylene polymer compositions. Each composition was extrusion blown to form films. The block forces of each polymer composition was measured and compared with the block forces of the low density polyethylene polymer not containing any additive.

TABLE 1

| Additive | Amount (Weight Percent) | Blocking Force (grams/16 sq. in.) |
|---|---|---|
| None | 0 | 132.3 |
| Microken 801* | 0.15 | 105.7 |
| Silica | 0.15 | 59.1 |
| Erucamide | 0.20 | 40.9 |
| N-ethanol stearmide | 0.20 | 49.1 |
| N-Behenyl lactamide | 0.20 | 23.5 |
| N-Behenyl lactamide plus | 0.20 | |
| Microken 801 | 0.15 | 23.3 |
| N-Behenyl lactamide | 0.40 | 20.8 |
| N-Behenyl lactamide plus | 0.40 | |
| Microken 801 | 0.15 | 17.9 |

*Microken 801 is a diatomaceous earth

TABLE 2

| Additive | Amount (Weight Percent) | Blocking Force (grams/sq. inch) |
|---|---|---|
| N-Palmityl lactamide | 0.2 | 106.6 |
| N-Palmityl lactamide plus | 0.2 | |
| Microken 801 | 0.15 | 55.4 |
| N-Palmityl lactamide | 0.4 | 78.9 |
| N-Palmityl Lactamide plus | 0.4 | |
| Microken 801 | 0.15 | 44.5 |
| N-Stearyl lactamide | 0.2 | 111.4 |
| N-Stearyl lactamide plus | 0.2 | |
| Microken 801 | 0.15 | 35.4 |
| N-Stearyl lactamide | 0.4 | 30.8 |
| N-Stearyl lactamide plus | 0.4 | |
| Microken 801 | 0.15 | 23.8 |

TABLE 3

| Additive | Amount (Weight Percent) | Blocking Force (grams/16 sq. in.) |
|---|---|---|
| *Mixture of lactamides | 0.2 | 22.2 |
| *Mixture of lactamides plus Microken 801 | 0.2 0.15 | 15.0 |
| N-Behenyl lactamide | 0.1 | 54.6 |
| N-Behenyl lactamide plus Microken 801 | 0.1 0.15 | 39.3 |
| N-Palmityl lactamide | 0.6 | 70.3 |
| N-Palmityl lactamide plus Microken 801 | 0.6 0.15 | 42.4 |

*The mixture of lactamides contained N-palmityl lactamide (12.9%), stearyl lactamide (26.0%), arachidyl lactamide (22.6%) and behenyl lactamide (38.0%).

TABLE 4

| Additive | Amount (Weight Percent) | Blocking Force (grams/16 sq. in.) |
|---|---|---|
| None | 0 | 71.9 |
| Microken 801 | 0.30 | 44.4 |
| Erucamide | 0.20 | 42.1 |
| Mixture of Lactamide | 0.20 | 32.9 |
| Mixture of Lactamide plus Microken 801 | 0.20 0.30 | 27.5 |

TABLE 4-continued

| Additive | Amount (Weight Percent) | Blocking Force (grams/16 sq. in.) |
| --- | --- | --- | a. Polypropylene petrothene PP 8000-GK of Quantum Chemical Co. was extrusion cast to form films containing various additives.
b. The mixture of lactamides contained N-palmityl lactamide (12.9%), stearyl lactamide (26.00%), arachidyl lactamide (22.6%) and behenyl lactamide (38.0%).

As can be seen from the test results presented in Table 1, low density polyethylene film containing no additive showed a high blocking force. The addition of Microken 801 did not significantly improve the blocking force which was still higher than 100 grams/16 square inches. The incorporation of silica into the low density polyethylene film lowered the block force which was still higher than 50 grams/16 square inch, indicating an unacceptable product. On the contrary, the incorporation of N-behenyl lactamide into the low density polyethylene film lowered the block force considerably below 30. an indication of an acceptable product. Thus Table 1 establishes the value of incorporating N-behenyl lactamide into polyolefin polymers to improve the block properties of the polymer.

Table 2 and 3 demonstrate the usefulness of additional N-alkyl lactamides for reducing the block of low density polyethylene polymer. Table 4 shows the usefulness of N-alkyl lactamides for reducing the block of polypropylene polymer.

As can be seen from the results of the experimental data, the use of the specific lactamides of the present invention in polyolefins reduces the blocking properties of the polyolefins. Furthermore the lactamide can be used in combination with finely divided inorganic material. This combination of components enhances the reduction in the blocking properties of the polyolefinic compositions. These optional materials generally have a particle size of from 0.1 to about 100 microns, or higher. Included among the finely divided inorganic materials useful in combination with the lactamides in the present invention are silica, mica, talc, diatomaceous earth and limestone. The finely divided inorganic material is generally used in amounts of from about 0.05 to about 1.0. preferably from about 0.1 to about 0.5 weight percent of the weight of the polyolefin polymer.

It should be understood that the embodiments of the present invention which have been described are merely illustrative of a few of the applications of the principles of the present invention. Numerous modifications may be made by those skilled in the art without departing from the spirit and scope of the invention.

I claim:

1. A composition of matter comprising a polyolefin and 0.05 to 0.5 weight percent based on the weight of the polyolefin of at least one lactamide having the structural formula:

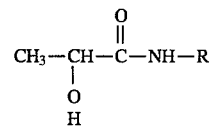

wherein R is alkyl having from about 14 to about 22 carbon atoms.

2. The composition of matter of claim 1 wherein the polyolefin is a homopolymer or copolymer of ethylene or a homopolymer or a copolymer of propylene.

3. The composition of matter of claim 2 wherein the polyolefin is a low density polyethylene.

4. The composition of matter of claim 1 wherein the lactamide is N-behenyl lactamide.

5. The composition of claim 1 wherein the lactamide is N-stearyl lactamide.

6. The composition of claim 5 wherein the lactamide is a mixture of N-palmityl lactamide, N-behenyl lactamide, N-stearyl lactamide and N-arachidyl lactamide.

* * * * *